June 28, 1949.　　　　J. C. BUSQUET　　　2,474,615
COUPLING COOLING

Filed June 5, 1946　　　　　　　　　　2 Sheets-Sheet 1

Inventor:
J. C. Busquet,
By E. F. Wenderoth
atty

June 28, 1949.  J. C. BUSQUET  2,474,615
COUPLING COOLING
Filed June 5, 1946  2 Sheets-Sheet 2
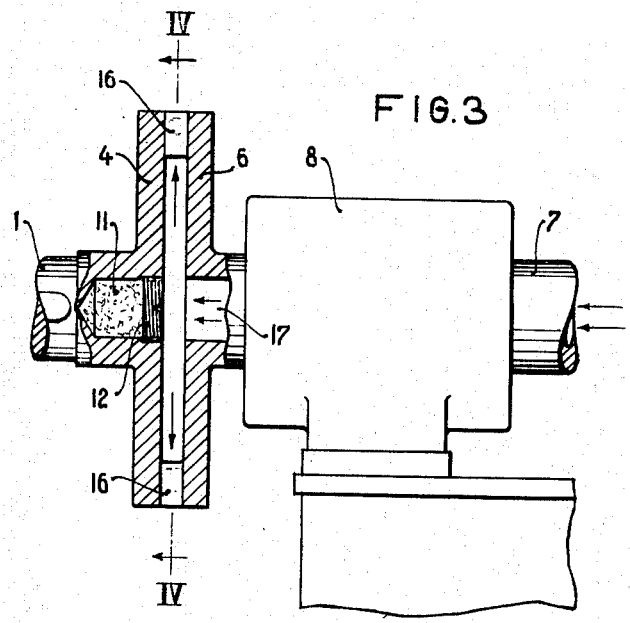
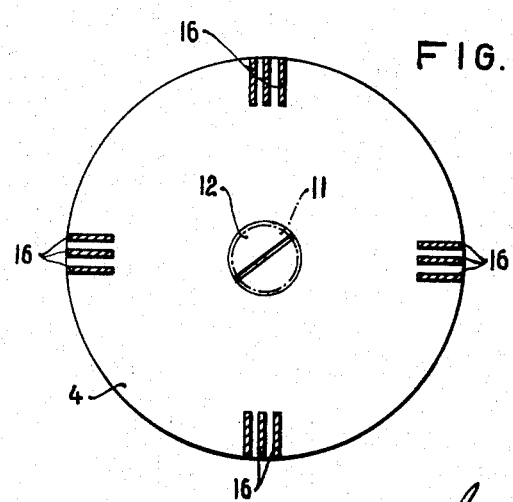

Patented June 28, 1949

2,474,615

UNITED STATES PATENT OFFICE 2,474,615

COUPLING COOLING

Jan C. Busquet, Hengelo, Netherlands, assignor to Machinefabriek Gebr. Stork & Co. N. V., Hengelo, Netherlands, a company of the Netherlands Application June 5, 1946, Serial No. 674,561
In the Netherlands July 27, 1944

Section 1, Public Law 690, August 8, 1946
Patent expires July 27, 1964

6 Claims. (Cl. 287—129)

This invention relates to an engine or an apparatus operating with hot gases, such as a fan or a turbine, having an impeller and two discs arranged coaxially with respect to the impeller outside the casing of the engine for rotation with the impeller and transmitting the driving torque, means being provided for generating a flow of cooling air between the discs.

A fan of this type is known wherein the boss of the impeller of which consists of two discs one of which carries the vanes and the other is fixed on the shaft of the fan. The discs are connected to each other by means of bolts provided with springs and screwed into one of the discs and extending through holes in the other disc in such a manner that the discs are urged towards each other and the ribs provided on one of the discs for generating a flow of cooling air contact with the other disc. In order to centre the discs with respect to each other the disc of the impeller is secured on the axis of the shaft of the fan by means of a bolt. With this construction the heat of the impeller is freely conducted to the shaft by the centring bolt as said latter is not situated in the flow of cooling air.

The invention has for its object to wholly prevent the transmission of heat to the bearings of the shaft. To this end the shaft of the impeller according to the invention is interrupted between the casing of the engine and the adjacent bearing of the shaft, and both adjoining ends of the sections of the shaft are each formed to or united with a disc, said discs being rigidly connected to each other by means of pin-shaped members and the sections of the shaft as well as the rest of the discs are free of each other. As with this arrangement the heat of one of the sections of the shaft can be conducted to the other section only through the pin-shaped members and as the heat is withdrawn from the pins by the cooling air the heat is not transmitted to the bearing so that said latter remains cool.

With a convenient embodiment the pin-shaped members have an oblong cross section in radial direction and they themselves generate the flow of cooling air.

The invention will now be described with reference to the accompanying drawings which illustrate two embodiments of a shaft construction for a fan rotor.

In said drawings:

Fig. 3 shows another embodiment of the part of rotorshaft situated outside the fan casing, and Fig. 4 is a cross section along the line IV—IV in Fig. 3.

Figure 1:
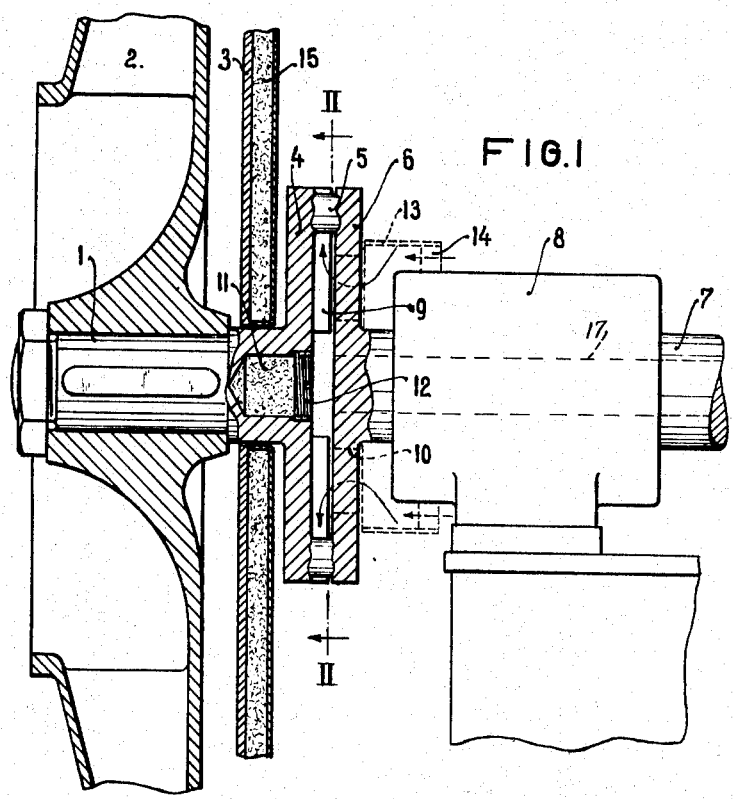
Fig. 1 is a longitudinal section of a fan rotor with the shaft bearing in side elevation.

The shaft 1 which carries the impeller 2 is enlarged upon the fan casing 3 so as to form a disc 4. The disc 4 may be a separable element and connected to the shaft 1 by any suitable means. Near the circumference of disc 4 pins 5 are provided thereon which are connected to a similar disc 6. The disc 6 is integrally connected with the shaft section 7 rotating in a bearing 8.

To its side facing the disc 6 the disc 4 is provided with several radially directed vanes 9 and the disc 6 has some holes 10. When the fan is operating the vanes 9 will suck air through the holes 10 according to the arrows shown in Fig. 1 and said air flows outwards along the pins 5 so that the pins are very efficiently cooled. Thereby the conduction of heat from the disc 4 to the disc 6 is prevented and the shaft bearing remains cool.

As the pins 5, which may be connected to the discs e. g. by welding or by screw thread, are situated on a large diameter their cross sectional area for equal torsional and bending stresses as occur in the shaft sections will be small so that they can be cooled efficiently. For furthering said cooling, the pins may eventually be provided with cooling ribs.

In order to reduce the heat conducting area between the hot shaft section 1 and the disc 4 said shaft section may be provided with a bore 11 which may be filled with heat insulating material and may then be closed by a nut 12. As the bore 11 lies in the axis of the shaft the moment of resistance against torsion and bending is with respect to the solid shaft reduced by a small amount only.

By providing a shield 13 around the end of the bearing 8 which is supported on the bearing by means of some studs 14, the air sucked in by the vanes 9 is conducted along the bearing so as to cool said latter.

In order to reduce the heat losses, the wall 3 of the fan casing may be provided with the usual insulating layer 15 which also reduces the radiation of heat towards the disc 4.

Figure 2:
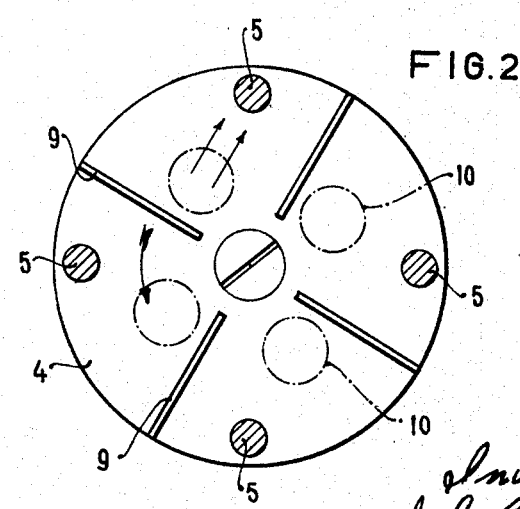
Fig. 2 is a cross section of the fan shaft along the line II—II in Fig. 1.

In the embodiment according to Figures 3 and 4 the discs 4 and 6 are connected to each other by several sets of small plates 16 which not only replace the pins 5 shown in Fig. 1 and 2 but also perform the function of the vanes 9. With this embodiment the air is not sucked in through holes in the disc 6 but through a central bore 17 in the shaft section 7 according to the arrows shown in Fig. 3.

What I claim is:

1. A coupling of low heat conductivity between two spaced axially aligned rotating shafts comprising: two spaced parallel discs mounted on adjacent ends of said shafts, one of said discs having an aperture therein to permit the flow of a fluid through said aperture, and means to connect said discs at spaced intervals near their peripheries whereby a cooling fluid may flow through said aperture and between said discs to cool said means.

2. The coupling of claim 1 wherein one of said shafts is hollow and said one disc is mounted on said hollow shaft with its aperture aligned with the hollow in said shaft.

3. The coupling of claim 1 wherein said means are radially longitudinal vanes to produce a fan for aiding the flow of said cooling fluid through said aperture and between said discs.

4. The coupling of claim 1 wherein one of said discs includes radially extending fins perpendicular to and extending partly across the space between said discs to produce a fan for aiding the flow of said cooling fluid through said aperture and between said discs.

5. In a coupling between two spaced axially aligned shafts comprising two spaced discs, one mounted on the adjacent end of each shaft and means to connect said discs together near their peripheries, a fin being radially mounted between and to at least one of said discs and a duct through one of said discs positioned closer to the axis of said discs than said fin.

6. The coupling of claim 5 wherein said means to connect said discs together comprises said fin

JAN C. BUSQUET.

REFERENCES CITED

The following references are of record in the file of this patent:

UNITED STATES PATENTS

| Number | Name | Date |
|---|---|---|
| 980,671 | Price | Jan. 3, 1911 |
| 1,849,793 | Dennison | Mar. 15, 1932 |
| 2,158,182 | Goddard | May 16, 1939 |
| 2,175,470 | Kice | Oct. 10, 1939 |